(12) United States Patent
Hsu et al.

(10) Patent No.: US 7,584,271 B2
(45) Date of Patent: Sep. 1, 2009

(54) METHOD, SYSTEM, AND COMPUTER READABLE MEDIUM FOR DELAYING THE CONFIGURATION OF A SHARED RESOURCE

(75) Inventors: Yu-Cheng Hsu, Tucson, AZ (US); John Norbert McCauley, Tucson, AZ (US); Cheng-Chung Song, Tucson, AZ (US); William Griswold Sherman, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 953 days.

(21) Appl. No.: 10/752,632

(22) Filed: Jan. 7, 2004

(65) Prior Publication Data

US 2005/0198230 A1    Sep. 8, 2005

(51) Int. Cl.
    *G06F 15/177*    (2006.01)
(52) U.S. Cl. .......................................... 709/220; 713/2
(58) Field of Classification Search ................ 709/221, 709/220, 248, 222; 714/13; 713/1, 2
    See application file for complete search history.

(56) References Cited

U.S. PATENT DOCUMENTS

| | | | |
|---|---|---|---|
| 5,109,484 A * | 4/1992 | Hughes et al. ............... 709/222 |
| 5,377,333 A * | 12/1994 | Nakagoshi et al. ........... 710/317 |
| 5,446,869 A | 8/1995 | Padgett et al. |
| 5,717,943 A * | 2/1998 | Barker et al. .................. 712/20 |
| 5,737,524 A | 4/1998 | Cohen et al. |
| 5,901,310 A | 5/1999 | Rahman et al. |
| 6,021,483 A | 2/2000 | Adar et al. |
| 6,101,559 A * | 8/2000 | Schultz et al. ................ 710/15 |
| 6,134,673 A * | 10/2000 | Chrabaszcz ................... 714/13 |
| 6,336,185 B1 * | 1/2002 | Sargenti et al. ................ 713/2 |
| 6,401,120 B1 | 6/2002 | Gamache et al. |
| 6,437,814 B1 | 8/2002 | Shimonaga et al. |
| 6,732,166 B1 * | 5/2004 | Woodruff ..................... 709/221 |
| 6,874,103 B2 * | 3/2005 | Cepulis ........................ 714/13 |
| 6,928,538 B2 * | 8/2005 | French et al. .................. 713/1 |
| 2003/0188108 A1 | 10/2003 | Damron et al. |
| 2004/0064761 A1 * | 4/2004 | Harrington et al. ............ 714/43 |

OTHER PUBLICATIONS

Intel; "MultiProcessor Specification"; May 1997; Intel Corporation; v 1.4; pp. 1-97.*
Microsoft; "How to Delay Loading of Specific Services"; Jun. 8, 2003; http://support.microsoft.com/?kbid=193888; pp. 1-3; retrieved on Mar. 4, 2008.*
IBM Corp., "PCI Type 1 Configuration in Type 0 Only Systems", Technical Disclosure Bulletin, vol. 38, No. 12, Dec. 1995, pp. 485-489.
PCT International Search Report, PCT/EP2004/053205 filed Jan. 12, 2004.
PCT Written Opinion, PCT/EP2004/053205 filed Jan. 12, 2004.

(Continued)

*Primary Examiner*—Andrew Caldwell
*Assistant Examiner*—Jeffrey Nickerson
(74) *Attorney, Agent, or Firm*—Rabindranath Dutta; Konrad Raynes & Victor LLP

(57) ABSTRACT

A determination is made as to whether a configuration indicator associated with a resource indicates a delayed configuration of the resource, wherein the resource is shared by a plurality of processing complexes via a bus, and wherein if the delayed configuration of the resource is indicated then the resource is prevented from being configured during initial program loads of the plurality of processing complexes. The resource is configured by only one of the of plurality of processing complexes that shares the resource, in response to determining that the configuration indicator associated with the resource indicates the delayed configuration of the resource.

12 Claims, 6 Drawing Sheets

OTHER PUBLICATIONS

R,S, Wilkins., et al., "Disaster Tolerant Wolfpack Geo-Clusters", IEEE International Conference on Cluster Computing 2002, pp. 1-6.
Reply to PCT Written Opinion dated Jul. 25, 2005, PCT/EP2004/053205 filed Jan. 12, 2004.

PCT Notification of Transmittal of the International Preliminary Report on Patentability mailed Oct. 13, 2005 for Application No. PCT/EP2004/053205 filed Dec. 1, 2004.

* cited by examiner

METHOD, SYSTEM, AND COMPUTER READABLE MEDIUM FOR DELAYING THE CONFIGURATION OF A SHARED RESOURCE

BACKGROUND

1. Field

The present disclosure relates to a method, system, and an article of manufacture for configuring a shared resource.

2. Description of the Related Art

A multi-cluster system may couple a plurality of computing nodes together. The plurality of coupled computing nodes may collectively perform as a single computational system. The multi-cluster system may be used for parallel processing, load balancing, fault tolerance, etc., and implement a high-availability system or a redundant information technology system. For example, certain multi-cluster systems may store the same data in a plurality of computing nodes, where a computing node may be a computational unit, a storage unit, etc. When one computing node of the multi-cluster system is unavailable, an alternate computing node of the multi-cluster system may be used to substitute the unavailable computing node.

A Peripheral Component Interconnect (PCI) bus may be used to interconnect devices, with the local bus of a processor and main memory. In certain multi-cluster systems, a PCI adapter may be shared by a plurality of computing nodes via a PCI bus. Hosts may communicate with the computing nodes of the multi-cluster system via the shared PCI adapter.

If a PCI adapter is shared among a plurality of computing nodes of a multi-cluster system, then the failure of one computing node may still allow the hosts to continue communications with other computing nodes of the multi-cluster system. Such hosts may be able to access the shared PCI adapter and access data associated with the computing nodes that have not failed.

SUMMARY OF THE PREFERRED EMBODIMENTS

Provided are a method, system, and article of manufacture, wherein in certain embodiments a determination is made as to whether a configuration indicator associated with a resource indicates a delayed configuration of the resource, wherein the resource is shared by a plurality of processing complexes via a bus, and wherein if the delayed configuration of the resource is indicated then the resource is prevented from being configured during initial program loads of the plurality of processing complexes. The resource is configured by only one of the of plurality of processing complexes that shares the resource, in response to determining that the configuration indicator associated with the resource indicates the delayed configuration of the resource.

In further embodiments, determining whether the configuration indicator associated with the resource indicates the delayed configuration of the resource is performed during the initial program loads of the processing complexes. The initial program loads of the plurality of processing complexes that share the resource are completed, in response to determining that the configuration indicator associated with the resource indicates the delayed configuration of the resource, wherein configuring the resource by only one of the plurality of processing complexes is subsequent to completing the initial program loads of the plurality of processing complexes that share the resource.

In yet additional embodiments, wherein the only one of the plurality of processing complexes is a logical owner of the resource, the logical owner broadcasts a configuration information of the configured resource to other processing complexes of the plurality of processing complexes.

In still further embodiments, a determination is made of a failure of the only one of the plurality of processing complexes that configured the resource, wherein the only one of the plurality of processing complexes is a logical owner of the resource. A new logical owner of the resource is determined from the plurality of processing complexes, in response to determining the failure, wherein the new logical owner is responsible for a subsequent configuration of the resource.

In yet additional embodiments, wherein the only one of the plurality of processing complexes is an original logical owner of the resource, a new logical owner of the resource is determined from the plurality of processing complexes, in response to a failure of the original logical owner. A determination is made that the original logical owner has recovered from the failure. Logical ownership of the resource is transferred from the new logical owner to the original logical owner, in response to determining that the original logical owner has recovered from the failure.

In yet further embodiments, determining whether the configuration indicator associated with the resource indicates a delayed resource is performed during the initial program loads of the plurality of processing complexes. A configuration of the resource is deferred until the initial program loads are completed for the plurality of processing complexes, in response to determining that the configuration indicator associated with the resource indicates the delayed configuration of the resource.

In further embodiments, the plurality of processing complexes comprise a multi-cluster system, wherein the plurality of processing complexes are accessed by a host via the configured resource that is shared by the plurality of processing complexes.

In yet additional embodiments, determining whether a configuration indicator associated with a resource indicates a delayed configuration of the resource is performed by a boot application implemented in a first processing complex of the plurality of processing complexes, wherein configuring the resource by only one of the plurality of processing complexes that shares the resource is performed by a clustering application implemented in the only one of the plurality of processing complexes.

In still further embodiments, configuring the resource is coordinated by a clustering application that spans the plurality of processing complexes.

In yet additional embodiments, the shared resource is a PCI adapter, wherein the bus is a PCI bus, and wherein the configuration indicator is implemented in the PCI adapter.

The embodiments allow a PCI adapter to be shared among a plurality of nodes, where the nodes are coupled to the PCI adapter by a PCI bus. An attribute associated with the shared PCI adapter may indicate that the configuration of the shared PCI adapter should be deferred until the completion of the initial program loads of the plurality of nodes. A clustering application implemented in the plurality of nodes may coordinate the plurality of nodes, such that, only a single node of the plurality of nodes configures the shared PCI adapter and broadcasts the configuration information of the shared PCI adapter to the other nodes.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made without departing from the scope of the present embodiments.

The embodiments allow a shared resource, such as, a PCI adapter, to be shared among a plurality of processing complexes. In certain embodiments, the shared PCI adapter is allowed to be configured by only one of the plurality of processing complexes.

Figure 1:
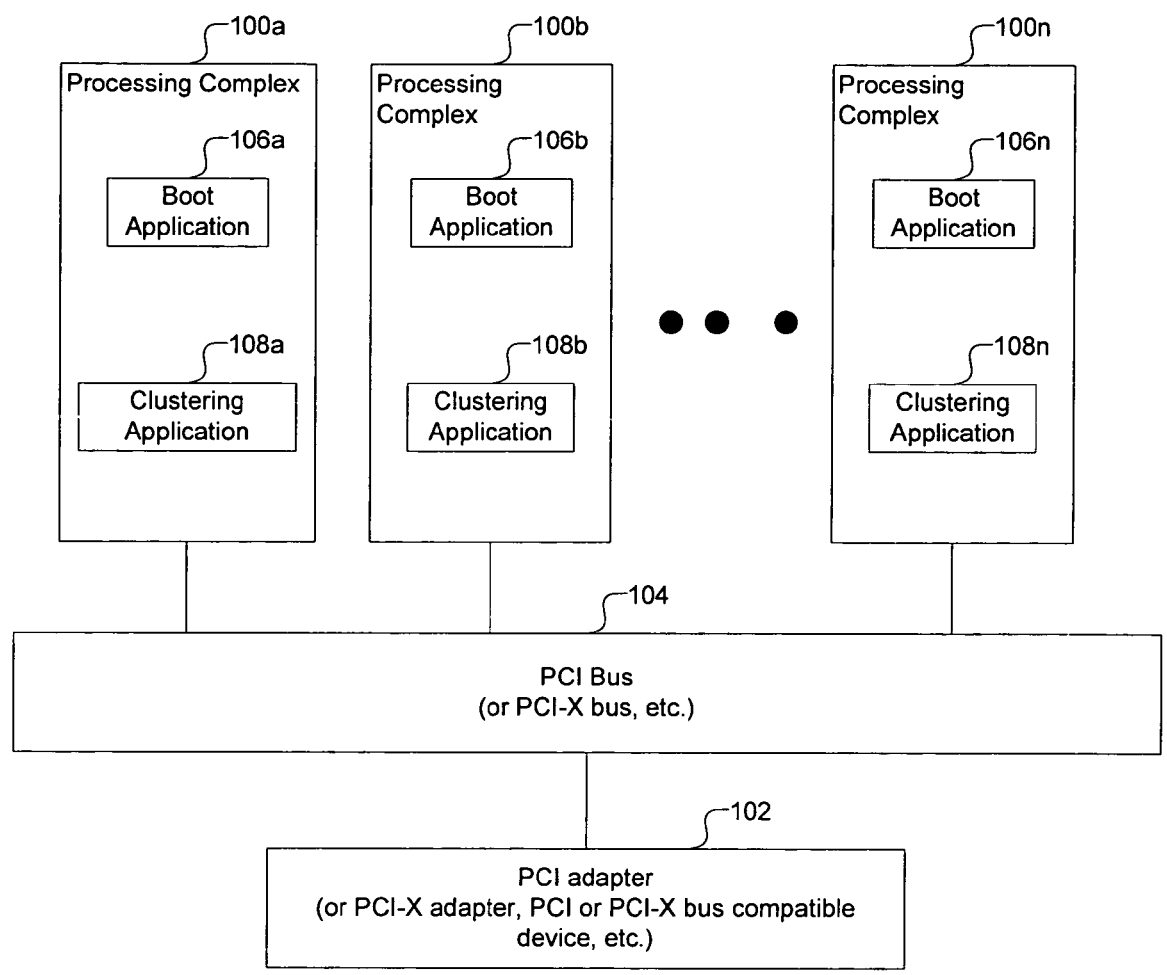
FIG. 1 illustrates a block diagram of a first computing environment, in accordance with certain described embodiments of the invention.

FIG. 1 illustrates a block diagram of a first computing environment, in accordance with certain embodiments of the invention.

In certain embodiments, a plurality of processing complexes $100a \ldots 100n$ are coupled to a PCI adapter 102 by a PCI bus 104. A processing complex, such as the processing complex $100a$, may include one or more computing nodes, where the computing nodes may include uniprocessor or multiprocessor systems. In some embodiments, a processing complex $100a \ldots 100n$ may include a personal computer, a workstation, a server, a mainframe, a hand held computer, a palm top computer, a telephony device, a network appliance, a blade computer, a storage controller, etc.

In certain embodiments, the PCI adapter 102 may be replaced by a PCI-X adapter, or any PCI or PCI-X bus compatible device. Furthermore, in alternative embodiments the PCI bus 104 may be replaced by a PCI-X bus or some other bus.

The plurality of processing complexes $100a \ldots 100n$ include a plurality of boot applications $106a \ldots 106n$ and a plurality of clustering applications $108a \ldots 108n$. For example, in certain embodiments, the processing complex $100a$ may include the boot application $106a$ and the clustering application $108a$, the processing complex $100b$ may include the boot application $106b$ and the clustering application $108b$, and the processing complex $100n$ may include the boot application $106n$ and the clustering application $108n$.

The boot applications $106a \ldots 106n$ and the clustering applications $108a \ldots 108n$ may be implemented in software, firmware, or hardware or any combination thereof.

A boot application $106a \ldots 106n$ when executed may perform an initial program load of the corresponding processing complex $100a \ldots 100n$. For example, the boot application $106a$ may perform an initial program load of the processing complex $100a$, the boot application $106b$ may perform an initial program load of the processing complex $100b$, and the boot application $106n$ may perform an initial program load of the processing complex $100n$. During an initial program load of a processing complex, the operating system (not shown), device drivers (not shown), etc., of the processing complex may be loaded, such that the processing complex becomes ready to execute other applications after the initial program load is completed.

The clustering applications $108a \ldots 108n$ when executed may allow the processing nodes $100a \ldots 100n$ to share the PCI adapter 102. In certain embodiments, only one clustering application may configure the PCI adapter 102 and broadcast the configuration information of the PCI adapter 102 to the other clustering applications. For example, in certain embodiments the clustering application $108a$ may configure the PCI adapter 102 and broadcast the configuration information of the PCI adapter 102 to the clustering application $108b \ldots 108n$ that may be executing in the processing complexes $100b \ldots 100n$. Although a plurality of clustering applications $108a \ldots 108n$ are shown, in certain embodiments the plurality of clustering applications $108a \ldots 108n$ may be part of a distributed clustering application associated with the processing complexes $100a \ldots 100n$.

Therefore, the embodiments described in FIG. 1 illustrate an implementation in which a PCI adapter 102 is shared by a plurality of processing complexes $100a \ldots 100n$. In certain embodiments, only a single processing complex may configure the PCI adapter 102 and broadcast the configuration information of the PCI adapter 102 to the other processing complexes.

Figure 2:
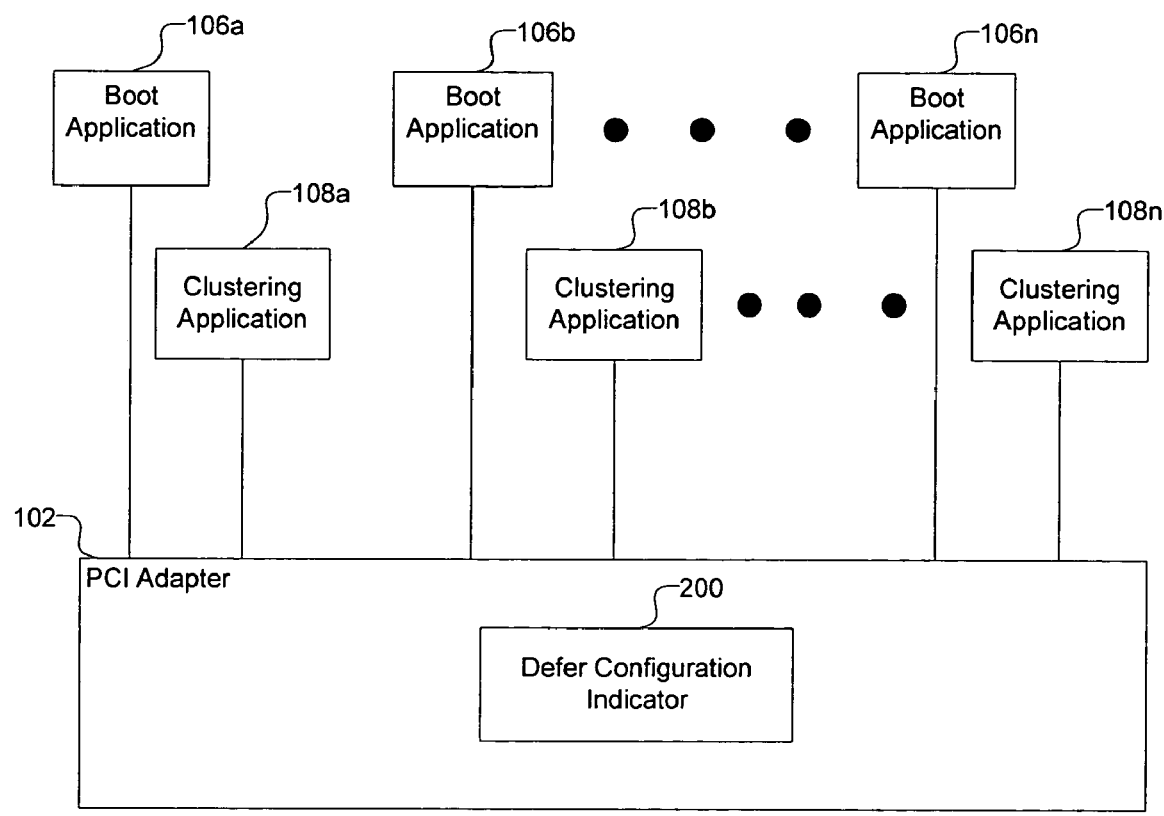
FIG. 2 illustrates a block diagram of data structures associated with a shared PCI adapter, in accordance with certain described embodiments of the invention.

FIG. 2 illustrates a block diagram of data structures associated with the PCI adapter 102, in accordance with certain embodiments of the invention. In certain embodiments, a defer configuration indicator 200 may be associated with the PCI adapter 102. In some embodiments, the defer configuration indicator 200 may represent a single bit of data, where the single bit of data may indicate whether configuration of the PCI adapter 102 should be deferred until the completion of the initial program loads of the processing complexes $100a \ldots 100n$.

For example, in certain embodiments if the single bit of data in the defer configuration indicator 200 is set to one, then the boot applications $106a \ldots 106n$ may not configure the PCI adapter 102 during initial program loads of the processing complexes $100a \ldots 100n$. In certain embodiments, only one of the clustering applications $108a \ldots 108n$, such as, clustering application $108a$, may configure the PCI adapter 102. The clustering applications $108a \ldots 108n$ may start executing only after the completion of the initial program loads of the processing complexes $100a \ldots 100n$.

Therefore, FIG. 2 illustrates an embodiment in which a defer configuration indicator 200 indicates whether configuration of the PCI adapter 102 should be deferred until the completion of the initial program loads of the processing complexes $100a \ldots 100n$.

Figure 3:
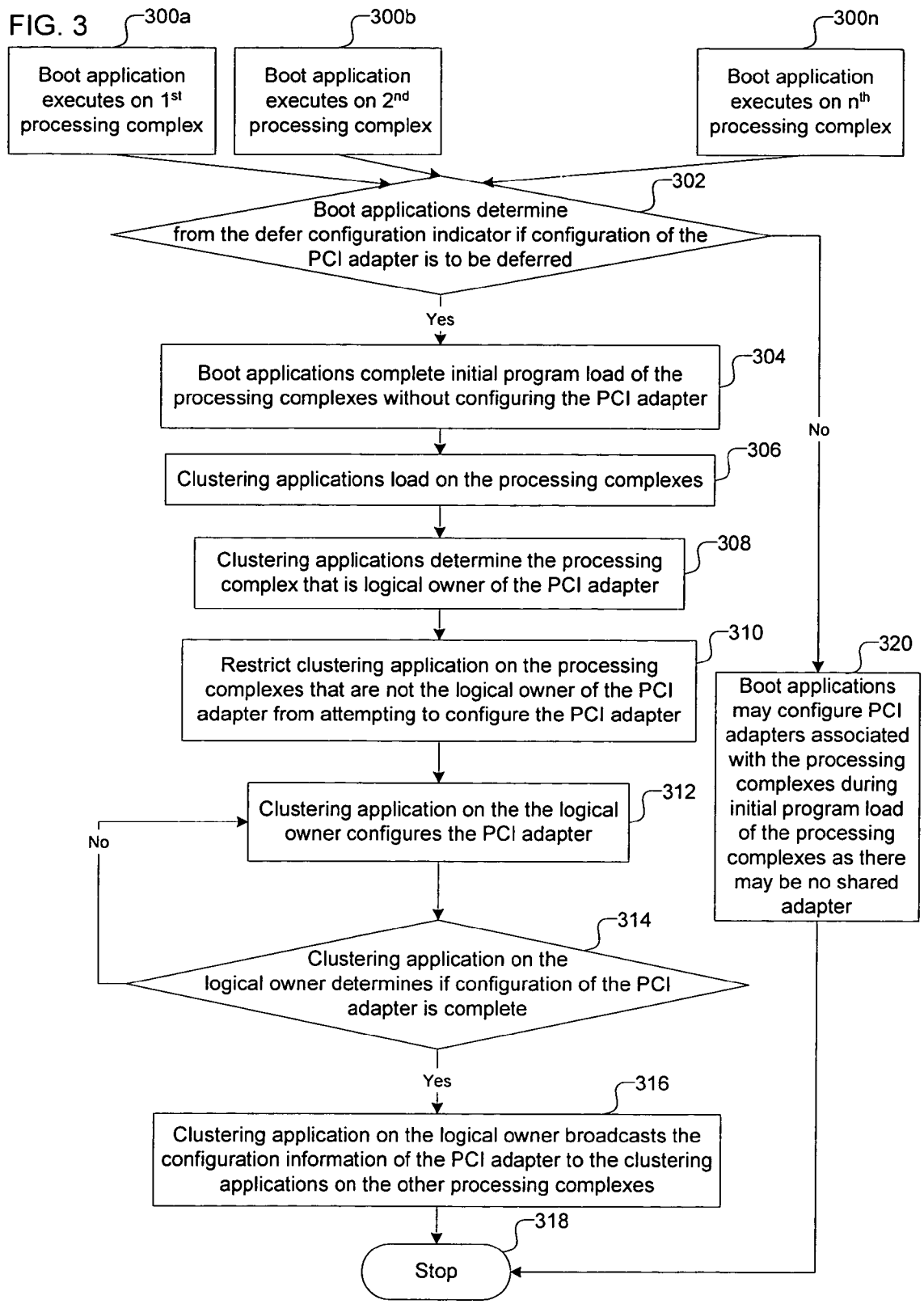
FIG. 3 illustrates logic for configuring a shared PCI adapter, in accordance with certain described embodiments of the invention.

FIG. 3 illustrates logic for configuring a shared PCI adapter implemented in the processing complexes $100a \ldots 100n$, in accordance with certain embodiments of the invention.

Control starts at blocks 300a ... 300n, where the boot applications 106a ... 106n execute in the corresponding processing complexes 100a ... 100n. For example, the boot application 106a executes (at block 300a) in the processing complex 100a, the boot application 106b executes (at block 300b) in the processing complex 100b, and the boot application 106n executes (at block 300n) in the processing complex 100n. The execution of the boot applications 106a ... 106n in the processing complexes 100a ... 106n may be in parallel. As a result of the execution of the boot applications 106a ... 106n, the initial program loads start in the processing complexes 100a ... 100n.

In certain embodiments, each of the boot applications 106a ... 106n may determine (at block 302) from the defer configuration indicator 200 whether the configuration of the PCI adapter 102 is to be deferred until the completion of the initial program loads of the processing complexes 100a ... 100n. If so, the boot applications 106a ... 106n complete (at block 304) the initial program loads of the processing complexes 100a ... 100n without configuring the PCI adapter 102.

The clustering applications 108a ... 108n load (at block 306) in the corresponding processing complexes 100a ... 100n. The clustering applications 108a ... 108n may collectively determine (at block 308) a processing complex that is the logical owner of the PCI adapter 102, where the processing complex that is the logical owner is included in the plurality of processing complexes 100a ... 100n. For example, in certain embodiments the processing complex 100a may be determined as the logical owner of the PCI adapter 102. The processing complex that is the logical owner of the PCI adapter 102 assumes the responsibility of configuring the PCI adapter 102 and broadcasting the configuration information of the PCI adapter 102 to the other processing complexes.

The clustering applications 108a ... 108n restrict (at block 310) those processing complexes that are not the logical owner of the PCI adapter 102 from attempting to configure the PCI adapter 102. The clustering application in the logical owner configures (at block 312) the PCI adapter 102. For example, in certain embodiments if processing complex 100a is the logical owner then the clustering application 108a may configure the PCI adapter 102.

The clustering application in the logical owner determines (at block 314) whether the configuration of the PCI adapter 102 is complete. If so, the clustering application in the logical owner broadcasts (at block 316) the configuration information of the PCI adapter 102 to the clustering applications of the other processing complexes. For example, if processing complex 100a is determined to be the logical owner of the PCI adapter 102, then the clustering application 108a distributes the configuration information of the PCI adapter to the clustering applications 108b ... 108n. The process stops (at block 318) in response to the completion of the broadcast of the configuration information of the PCI adapter 102.

If the clustering application in the logical owner determines (at block 314) that the configuration of the PCI adapter 102 is incomplete, then the clustering application in the logical owner continues configuring (at block 312) the PCI adapter 102.

If the boot applications 106a ... 106n determine (at block 302) from the defer configuration indicator 200 that the configuration of the PCI adapter 102 is not to be deferred then the boot applications 106a ... 106n may configure (at block 320) one or more PCI adapters associated with the processing complexes 100a ... 100n during the initial program loads of the processing complexes 100a ... 100n as there may be no shared PCI adapter among the processing complexes 100a ... 100n. Subsequent to the configuration, the process stops (at block 318).

Therefore, the logic of FIG. 3 illustrates certain embodiments in which configuration of the shared PCI adapter 102 is delayed until the completion of the initial program loads of the processing complexes 100a ... 100n. In response to the completion of the initial program loads of the processing complexes 100a ... 100n, only one of the plurality of processing complexes 100a ... 100n may configure the shared PCI adapter 102 and broadcast the configuration information of the shared PCI adapter 102 to the other processing complexes.

Figure 4:
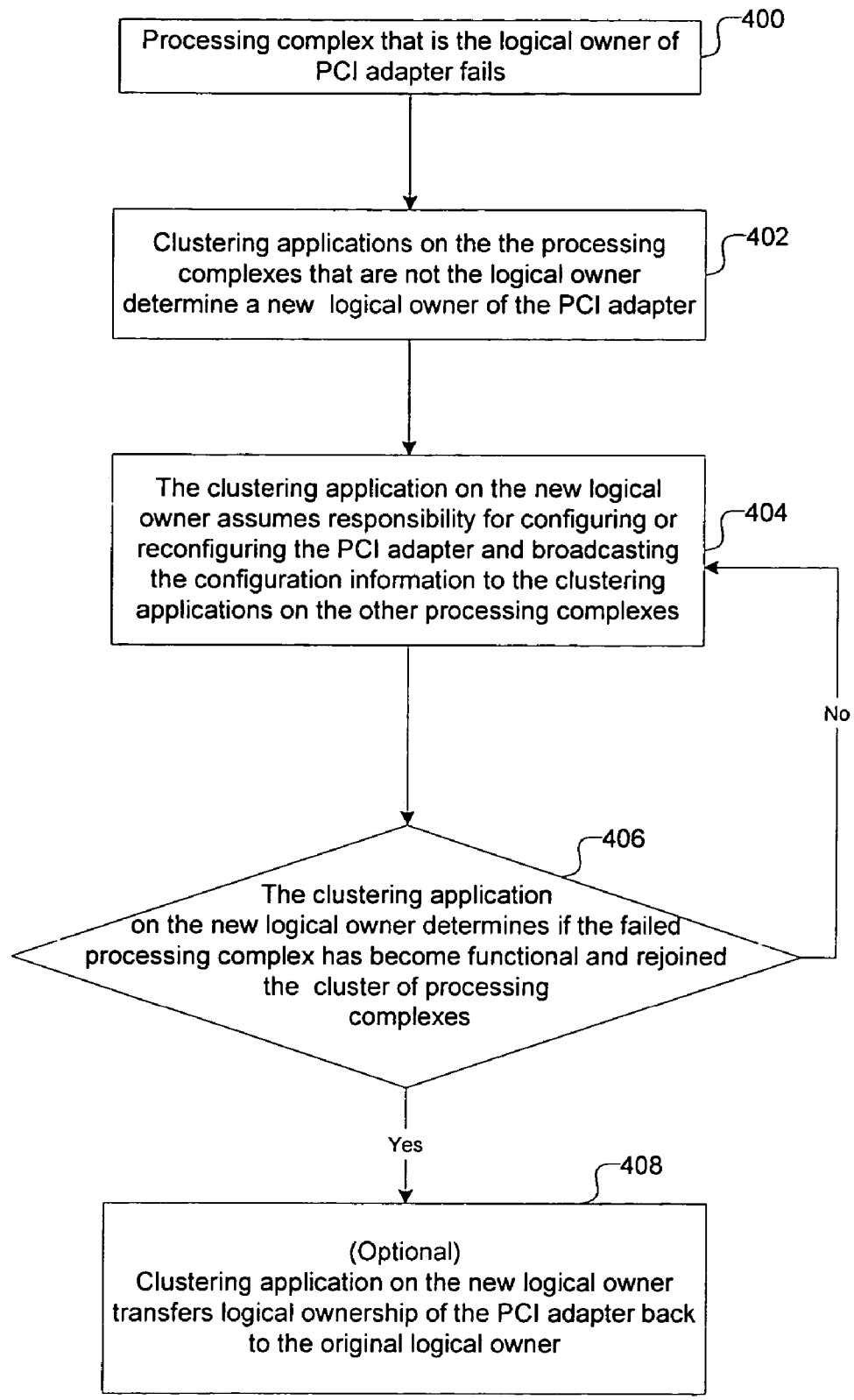
FIG. 4 illustrates logic for transferring logical ownership of a shared PCI adapter, in accordance with certain described embodiments of the invention.

FIG. 4 illustrates logic for transferring logical ownership of the shared PCI adapter 102, in accordance with certain described embodiments of the invention. In certain embodiments, the logic for transferring logical ownership of the shared PCI adapter may be implemented in the clustering applications 108a ... 108n that execute in the processing complexes 100a ... 100n.

Control starts at block 400, where the processing complex that is the logical owner of the PCI adapter 102 fails. The failure may be as a result of a malfunctioning of the logical owner because of a software, hardware, or firmware error. Failures of the logical owner may also occur because of other reasons.

The clustering applications in the processing complexes that are not the logical owner determine (at block 402) a new logical owner of the PCI adapter 102. For example, in certain embodiments if the logical owner that failed is the processing complex 100a, then the clustering applications 108b ... 108n determine a new logical owner of the PCI adapter 102 from the processing complexes 100b ... 100n.

The clustering application in the new logical owner assumes (at block 404) responsibility for configuring or reconfiguring the PCI adapter 102 and broadcasting the configuration information of the PCI adapter 102 to the clustering applications in the other processing complexes. For example, if processing complex 100a had failed and the new logical owner is the processing complex 100b, then the new logical owner 100b may assume the responsibility for configuring or reconfiguring the PCI adapter 102 and broadcasting the configuration information of the PCI adapter 102 to the clustering applications 108c ... 108n in the processing complexes 100c ... 100n, where the processing complexes 100a, 100b, 100c, ... 100n share the PCI adapter 102.

In certain embodiments, the clustering application in the new logical owner determines (at block 406) whether the failed processing complex has become functional and rejoined the processing complexes, where the processing complexes may form a multi-cluster environment. If so, in certain embodiments the clustering application in the new logical owner may transfer (at block 408) logical ownership of the shared PCI adapter 102 back to the old logical owner. For example, the new logical owner 100b may optionally transfer logical ownership of the shared PCI adapter 102 back to the original logical owner 100a, if the original logical owner 100a is no longer a failed processing complex. If the clustering application in the new logical owner determines (at block 406) that the failed processing complex has not become functional, then the new logical owner continues (at block 404) to assume responsibility for configuring the shared PCI adapter 102 and broadcasting the configuration information.

Therefore, FIG. 4 illustrates certain embodiments in which in the event of a failure of a logical owner of the shared PCI adapter 102, the other processing complexes determine a new logical owner that assumes the responsibility of configuring the PCI adapter 102 and broadcasting the configuration information of the PCI adapter 102 to the other functioning processing complexes. In the event of a recovery from failure of the original logical owner, in certain embodiments the new logical owner may in transfer the logical ownership of the PCI adapter back to the original logical owner.

Figure 5:
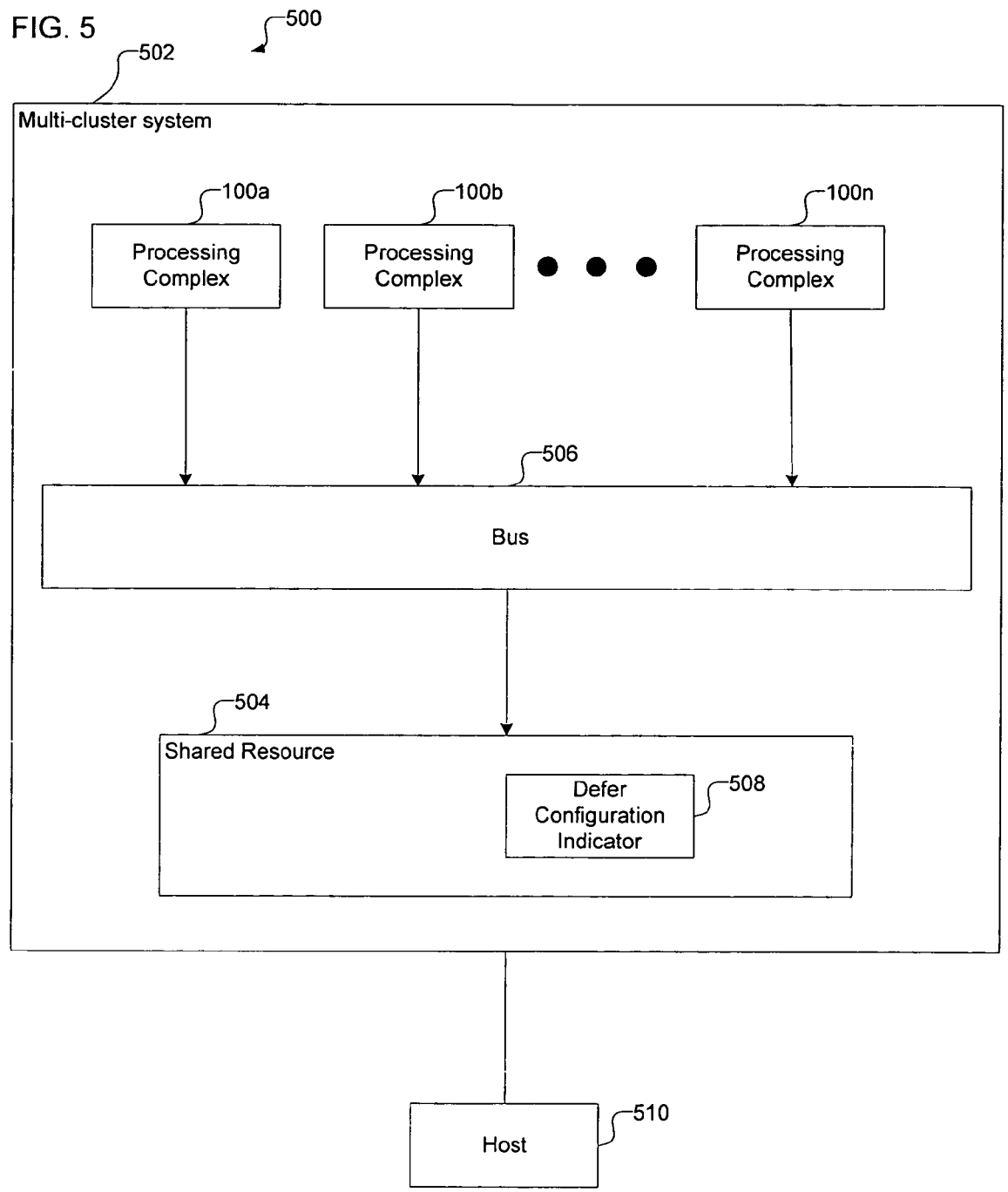
FIG. 5 illustrates a block diagram of a second computing environment, in accordance with certain described embodiments of the invention.

FIG. 5 illustrates a block diagram of a second computing environment 500, in accordance with certain described embodiments of the invention. In the second computing environment 500, the plurality of processing complexes 100a . . . 100n may comprise a multi-cluster system 502, where a processing complex in the plurality of processing complexes 100a . . . 100n is a node of the multi-cluster system 502.

The processing complexes 100a . . . 100n in the multi-cluster system 502 may be coupled to a shared resource 504 via a bus 506. In certain embodiments, the shared resource 504 may include the PCI adapter 102 and the bus 506 may be a PCI bus. In certain embodiments, other resources besides the PCI adapter 102 may comprise the shared resource 504. The shared resource 504 may include a defer configuration indicator 508 that indicates whether the configuration of the shared resource 504 should be delayed until the processing complexes 100a . . . 100n of the multi-cluster system 502 have completed initial program loads. Subsequent to the completion of the initial program loads of the processing complexes 100a . . . 100n of the multi-cluster system 502, only one of the processing complexes 100a . . . 100n may configure the shared resource 504 and broadcast the configuration information of the shared resource to the other processing complexes.

A host 510 that is coupled to the multi-cluster system 502 may access data in the processing complexes 100a . . . 100n via the shared resource 504. Even if one of more processing complexes 100a . . . 100n fail, the other processing complexes may still be accessed by the host 510 via the shared resource 504.

Therefore, FIG. 5 illustrates certain embodiments in which the shared resource 504 may be configured by only one of a plurality of processing complexes 100a . . . 100n in a multi-cluster system 502. In the event of a failure of one of more processing complexes, data in the other processing complexes may be accessed by a host 510 via the shared resource 504.

In certain computing systems, it is desirable to share a resource, such as, a PCI adapter, among a plurality of processing complexes. The embodiments allow a shared resource, such as, a PCI adapter, to be shared among a plurality of processing complexes, where the processing complexes are coupled to the PCI adapter by a PCI bus. In certain embodiments the processing complexes may comprise nodes of a multi-cluster system.

In some embodiments, if one processing complex fails, the ownership of the shared PCI adapter may be transferred to one of the other processing complexes. The embodiments also allow the shared PCI adapter to access data associated with the plurality of processing complexes Therefore, a host that may be coupled to the processing complexes may access the data associated with the processing complexes via the shared PCI adapter.

An attribute that indicates that configuration of the shared PCI adapter should be deferred until the completion of the initial program loads of the processing complexes is associated with the shared PCI adapter. A clustering application implemented in the plurality of processing complexes may coordinate the plurality of processing complexes, such that, only a single processing complex of the plurality of processing complexes configures the shared PCI adapter and broadcasts the configuration information of the shared PCI adapter to the other processing complexes. If more than a single processing complex of the plurality of processing complexes were to configure the shared PCI adapter then the shared PCI adapter may be in an erroneous state and may not be shared among the plurality of processing complexes. The embodiments allow the PCI adapter to be shared among the plurality of processing complexes by configuring the PCI adapter with only one of the plurality of processing complexes.

Additional Implementation Details

The described techniques may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium (e.g., magnetic storage medium, such as hard disk drives, floppy disks, tape), optical storage (e.g., CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which embodiments are made may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the embodiments, and that the article of manufacture may comprise any information bearing medium known in the art.

Figure 6:
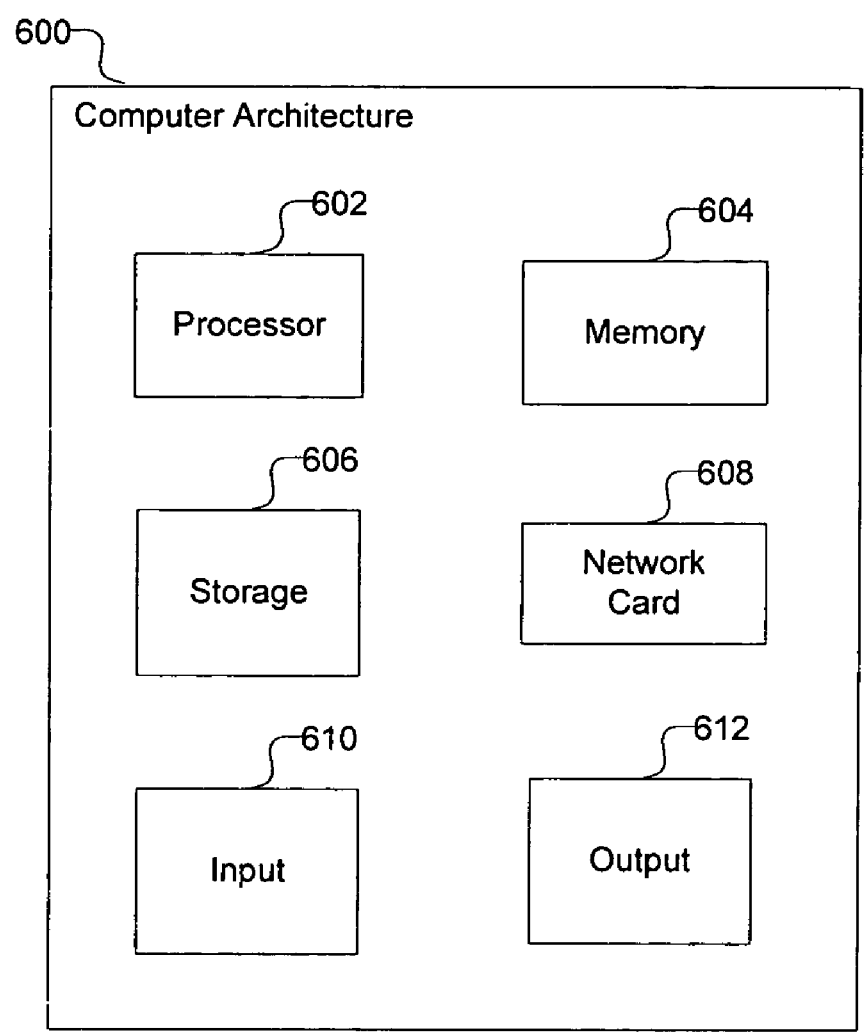
FIG. 6 illustrates a block diagram of a computer architecture in which certain described aspects of the invention are implemented.

FIG. 6 illustrates a block diagram of a computer architecture in which certain aspects of the invention are implemented. Any of the processing complexes 100a . . . 100n or the host 510 may implement a computer architecture 600 having a processor 602, a memory 604 (e.g., a volatile memory device), and storage 606 (e.g., a non-volatile storage, magnetic disk drives, optical disk drives, tape drives, etc.). The storage 606 may comprise an internal storage device, an attached storage device or a network accessible storage device. Programs in the storage 606 may be loaded into the memory 604 and executed by the processor 602 in a manner known in the art. The architecture may further include a network card 608 to enable communication with a network. The architecture may also include at least one input 610, such as a keyboard, a touchscreen, a pen, voice-activated input, etc., and at least one output 612, such as a display device, a speaker, a printer, etc.

The logic of FIGS. 3 and 4 describes specific operations occurring in a particular order. Further, the operations may be performed in parallel as well as sequentially. In alternative embodiments, certain of the logic operations may be performed in a different order, modified or removed and still implement embodiments of the present invention. Moreover, steps may be added to the above described logic and still conform to the embodiments. Yet further steps may be performed by a single process or distributed processes.

Many of the software and hardware components have been described in separate modules for purposes of illustration. Such components may be integrated into a fewer number of components or divided into a larger number of components.

Additionally, certain operations described as performed by a specific component may be performed by other components.

Therefore, the foregoing description of the embodiments has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:

executing a plurality of boot applications on a plurality of processing complexes that share a PCI adapter via a PCI bus, wherein the plurality of processing complexes comprise a multi-cluster system;

starting initial program loads on each of the plurality of processing complexes, in response to the executing of the plurality of boot applications;

determining, by each of the plurality of boot applications, whether a defer configuration indicator included in the PCI adapter indicates that a configuration of the PCI adapter is to be delayed, wherein the defer configuration indicator is a single bit of data; and in response to determining that the defer configuration indicator included in the PCI adapter indicates that the configuration of the PCI adapter is to be delayed, performing:

(i) completing, by the plurality of boot applications, the initial program loads of the plurality of processing complexes, wherein the initial program loads of the plurality of processing complexes includes loading operating systems and clustering applications on the plurality of processing complexes;

(ii) determining, by the clustering applications, a processing complex from the plurality of processing complexes, wherein the determined processing complex is a single logical owner of the PCI adapter;

(iii) configuring the PCI adapter by a clustering application on the single logical owner of the PCI adapter, wherein the PCI adapter is configured in response to completing the initial program loads of the plurality of processing complexes; and (iv) broadcasting, by the processing complex that is the single logical owner of the PCI adapter, a configuration information of the configured PCI adapter to other processing complexes of the plurality of processing complexes, in response to configuring the PCI adapter.

2. The method of claim 1, further comprising:

determining a failure of the single logical owner that configured the PCI adapter; and determining a new logical owner of the PCI adapter from the plurality of processing complexes, in response to determining the failure, wherein the new logical owner is responsible for a subsequent configuration of the PCI adapter.

3. The method of claim 1, wherein the single logical owner is an original logical owner of the PCI adapter, and wherein the method further comprises:

determining a new logical owner of the PCI adapter from the plurality of processing complexes, in response to a failure of the original logical owner;

determining that the original logical owner has recovered from the failure; and transferring logical ownership of the PCI adapter from the new logical owner to the original logical owner, in response to determining that the original logical owner has recovered from the failure.

4. The method of claim 1, wherein the plurality of processing complexes are accessed by a host via the configured PCI adapter that is shared by the plurality of processing complexes.

5. A system, comprising:

a plurality of processing complexes that comprise a multi-cluster system;

a PCI bus coupled to the plurality of processing complexes; and a PCI adapter shared by the plurality of processing complexes via the PCI bus, wherein the system is operable to perform operations, the operations comprising:

executing a plurality of boot applications on the plurality of processing complexes that share the PCI adapter via the PCI bus;

starting initial program loads on each of the plurality of processing complexes, in response to the executing of the plurality of boot applications;

determining, by each of the plurality of boot applications, whether a defer configuration indicator included in the PCI adapter indicates that a configuration of the PCI adapter is to be delayed, wherein the defer configuration indicator is a single bit of data; and in response to determining that the defer configuration indicator included in the PCI adapter indicates that the configuration of the PCI adapter is to be delayed, performing:

(i) completing, by the plurality of boot applications, the initial program loads of the plurality of processing complexes, wherein the initial program loads of the plurality of processing complexes includes loading operating systems and clustering applications on the plurality of processing complexes;

(ii) determining, by the clustering applications, a processing complex from the plurality of processing complexes, wherein the determined processing complex is a single logical owner of the PCI adapter;

(iii) configuring the PCI adapter by a clustering application on the single logical owner of the PCI adapter, wherein the PCI adapter is configured in response to completing the initial program loads of the plurality of processing complexes; and (iv) broadcasting, by the processing complex that is the single logical owner of the PCI adapter, a configuration information of the configured PCI adapter to other processing complexes of the plurality of processing complexes, in response to configuring the PCI adapter.

6. The system of claim 5, the operations further comprising:

determining a failure of the single logical owner that configured the PCI adapter; and determining a new logical owner of the PCI adapter from the plurality of processing complexes, in response to determining the failure, wherein the new logical owner is responsible for a subsequent configuration of the PCI adapter.

7. The system of claim 5, wherein the single logical owner is an original logical owner of the PCI adapter, and wherein the operations further comprises:

determining a new logical owner of the PCI adapter from the plurality of processing complexes, in response to a failure of the original logical owner;

determining that the original logical owner has recovered from the failure; and transferring logical ownership of the PCI adapter from the new logical owner to the original logical owner, in response to determining that the original logical owner has recovered from the failure.

8. The system of claim 5, wherein the plurality of processing complexes are accessed by a host via the configured PCI adapter that is shared by the plurality of processing complexes.

9. A computer readable medium, wherein code stored in the computer readable medium in response to being executed by a processor causes operations, the operations comprising:

executing a plurality of boot applications on a plurality of processing complexes that share a PCI adapter via a PCI bus, wherein the plurality of processing complexes comprise a multi-cluster system;

starting initial program loads on each of the plurality of processing complexes, in response to the executing of the plurality of boot applications;

determining, by each of the plurality of boot applications, whether a defer configuration indicator included in the PCI adapter indicates that a configuration of the PCI adapter is to be delayed, wherein the defer configuration indicator is a single bit of data; and in response to determining that the defer configuration indicator included in the PCI adapter indicates that the configuration of the PCI adapter is to be delayed, performing:

(i) completing, by the plurality of boot applications, the initial program loads of the plurality of processing complexes, wherein the initial program loads of the plurality of processing complexes includes loading operating systems and clustering applications on the plurality of processing complexes;

(ii) determining, by the clustering applications, a processing complex from the plurality of processing complexes, wherein the determined processing complex is a single logical owner of the PCI adapter;

(iii) configuring the PCI adapter by a clustering application on the single logical owner of the PCI adapter, wherein the PCI adapter is configured in response to completing the initial program loads of the plurality of processing complexes; and (iv) broadcasting, by the processing complex that is the single logical owner of the PCI adapter, a configuration information of the configured PCI adapter to other processing complexes of the plurality of processing complexes, in response to configuring the PCI adapter.

10. The computer readable medium of claim 9, the operations further comprising:

determining a failure of the single logical owner that configured the PCI adapter; and determining a new logical owner of the PCI adapter from the plurality of processing complexes, in response to determining the failure, wherein the new logical owner is responsible for a subsequent configuration of the PCI adapter.

11. The computer readable medium of claim 9, wherein the single logical owner is an original logical owner of the PCI adapter, and wherein the operations further comprise:

determining a new logical owner of the PCI adapter from the plurality of processing complexes, in response to a failure of the original logical owner;

determining that the original logical owner has recovered from the failure; and transferring logical ownership of the PCI adapter from the new logical owner to the original logical owner, in response to determining that the original logical owner has recovered from the failure.

12. The computer readable medium of claim 9, wherein the plurality of processing complexes are accessed by a host via the configured PCI adapter that is shared by the plurality of processing complexes.

* * * * *

UNITED STATES PATENT AND TRADEMARK OFFICE
CERTIFICATE OF CORRECTION

PATENT NO. : 7,584,271 B2  Page 1 of 1
APPLICATION NO. : 10/752632
DATED : September 1, 2009
INVENTOR(S) : Hsu et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1348 days.

Signed and Sealed this

Fourteenth Day of September, 2010

David J. Kappos
*Director of the United States Patent and Trademark Office*